US006114830A

United States Patent [19]

Luo

[11] Patent Number: 6,114,830

[45] Date of Patent: Sep. 5, 2000

[54] INFRARED REMOTE CONTROLLER USING SOLAR RECHARGEABLE CAPACITOR

[76] Inventor: Ching-Hsing Luo, Department of Electrical Engineering, National Cheng Kung University, Tainan 70101, Taiwan

[21] Appl. No.: 09/236,278

[22] Filed: Jan. 22, 1999

Related U.S. Application Data

[63] Continuation of application No. 08/932,008, Sep. 17, 1997, abandoned.

[51] Int. Cl.[7] ........ H01M 10/44

[52] U.S. Cl. ........ 320/101

[58] Field of Search ........ 320/132, DIG. 19, 320/DIG. 21, 101, 102

[56] References Cited

U.S. PATENT DOCUMENTS

| | | | |
|---|---|---|---|
| 4,056,764 | 11/1977 | Endo et al. | 320/101 |
| 4,517,517 | 5/1985 | Kinney | 320/127 |
| 4,547,629 | 10/1985 | Corless | 320/167 |
| 4,959,603 | 9/1990 | Yamamoto al. | 320/166 |
| 5,119,123 | 6/1992 | Tominaga et al. | 396/59 |
| 5,140,251 | 8/1992 | Wu | 320/132 |
| 5,280,220 | 1/1994 | Carter | 250/214 AL |
| 5,496,658 | 3/1996 | Hein et al. | 320/DIG. 21 |
| 5,592,169 | 1/1997 | Nakamura et al. | 340/173 |
| 5,600,231 | 2/1997 | Parker | 320/DIG. 21 |

*Primary Examiner*—Shawn Riley
*Assistant Examiner*—Pia Tibbits
*Attorney, Agent, or Firm*—Peter Gibson

[57] ABSTRACT

An infrared remote controller is provided with power by a capacitor supplied by an electrical power supply preferably including a photovoltaic panel which converts light into electricity. A main switch closes the circuit between the power capacitor and the controller. An interface circuit having at least one diode, but preferably at least two in parallel to minimize resistance, connects the power supply to the capacitor. This interface circuit may also include a power level testing circuit, preferably one utilizing a light emitting diode (LED). A rechargeable battery may be included in the power source for greater power reserve. A voltage reference or voltage regulator is recommended between the capacitor and the infrared remote controller. The sizing of the capacitor in accordance with the consumption requirements of an infrared remote controller and the operating voltage enables a very simple circuit overall. Comparatively quick recovery times between uses of the remote controller are enabled by the capacitor. The combination of the capacitor powered infrared remote controller and the reserve power provided by a rechargeable cell minimizes both the size of the photovoltaic panel and the size of the device overall.

18 Claims, 2 Drawing Sheets

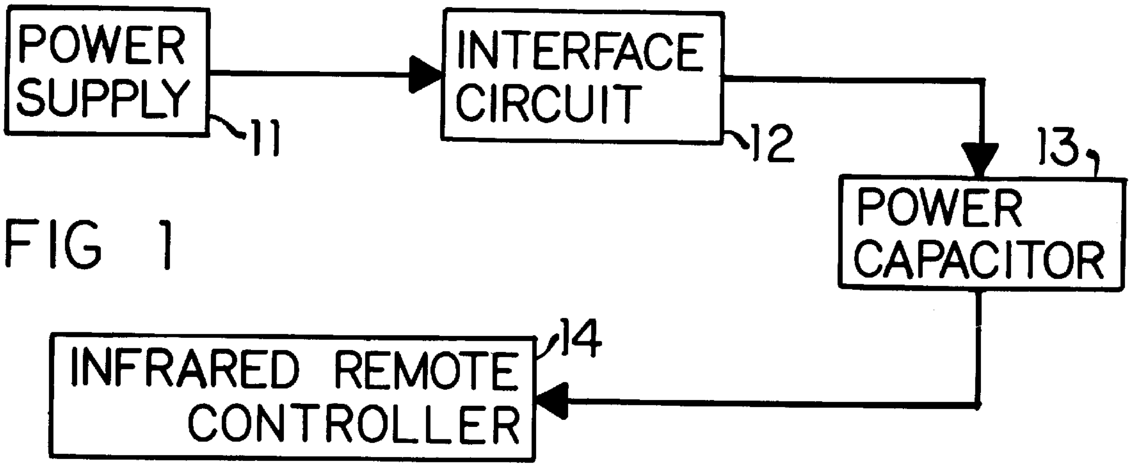
FIG 1
FIG 2
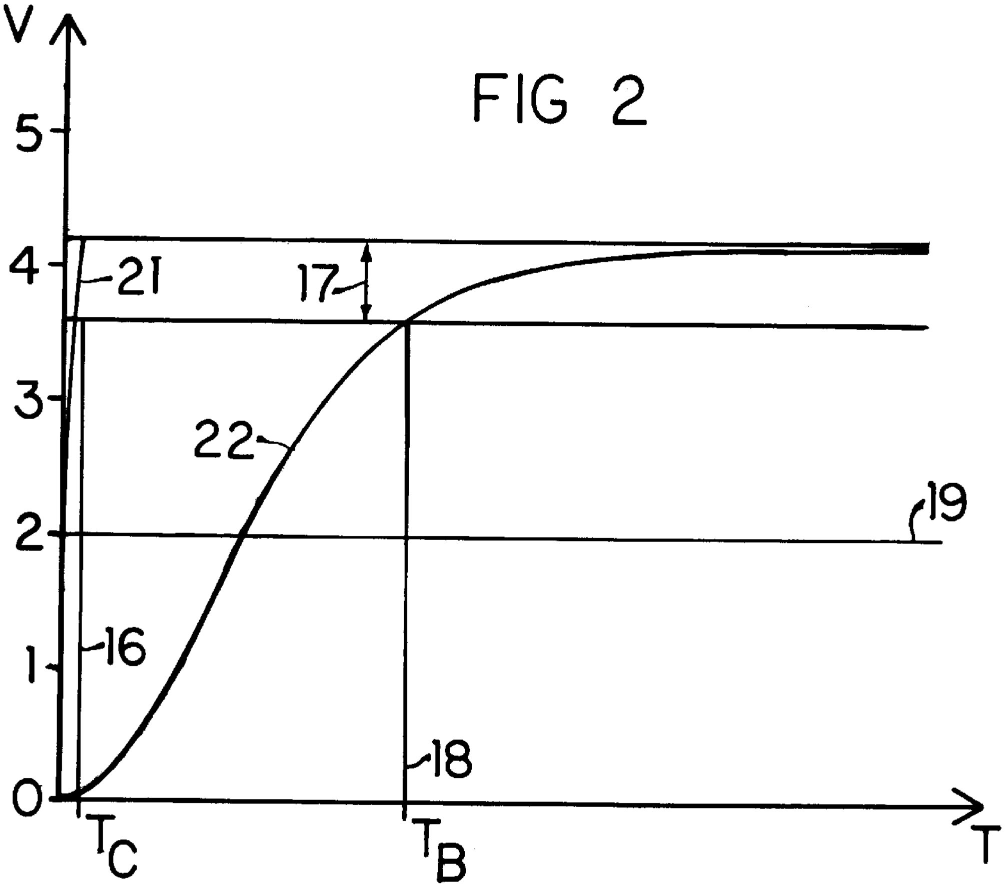

FIG 3
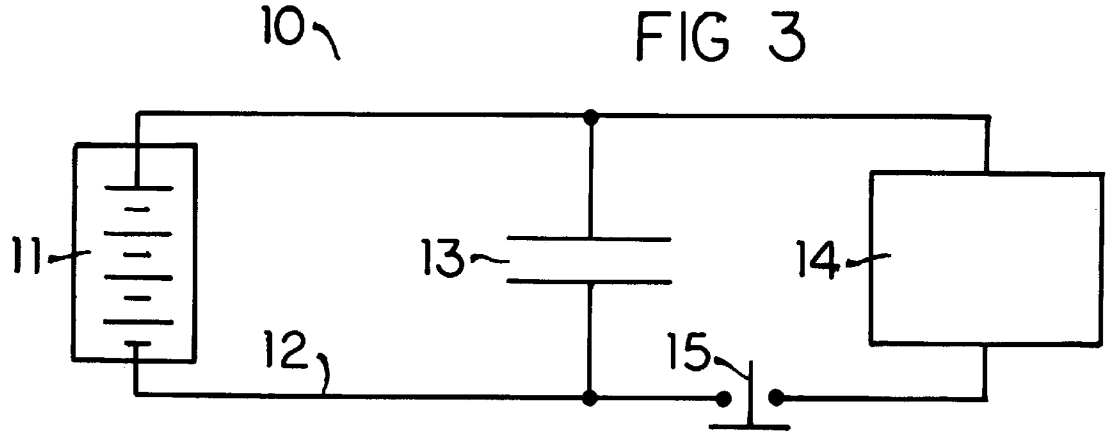
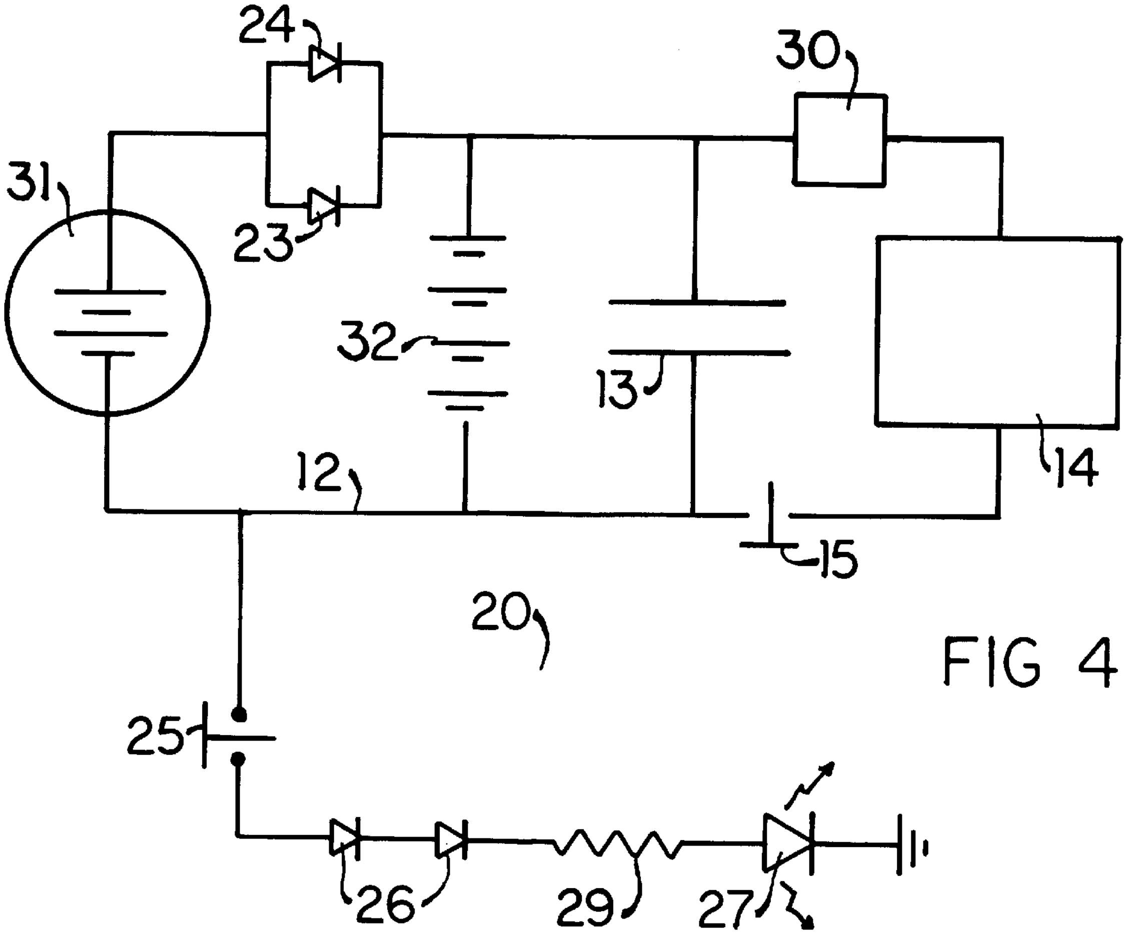
FIG 4

INFRARED REMOTE CONTROLLER USING SOLAR RECHARGEABLE CAPACITOR

This application for patent is a continuation in part of U.S. Ser. No. 08/932,008 filed Sep. 17, 1997 is now abandon.

BACKGROUND OF THE INVENTION

1. Field of the Invention

The field of the present invention relates generally to infrared remote controllers of electrical appliances, more particularly to such controllers which are powered by a renewable source such as photovoltaic panels or rechargeable batteries, most particularly to such controllers powered by a capacitor supplied by a renewable power source.

2. General Background

In many situations in which an infrared remote controller is utilized a relatively high quality electrical power is desired. In instances such as infrared remote controllers for automobiles, motorcycles, garage doors, et cetera, sufficient electricity for operation at the greatest possible distance is desired. Conventional dry cell batteries are typically encased within the rigid housing of the controller and removal of the batteries from the same typically requires the loosening of one or more screws. Whenever the operating distance diminishes to an uncomfortable level the user is obliged to replace the batteries. The amount of electricity required for the infrared remote controller to actuate at a distance is much greater than the amount required in proximity of the appliance being controlled. Hence the batteries are typically far from exhausted when operation becomes difficult.

The conventional infrared remote controller is further considered to possess certain undesirable characteristics: (a) the wastage of routinely replacing conventional, i.e. non-rechargeable, batteries; (b) the inconvenience of faulty operation under low power conditions; (c) the inconvenience imposed in replacing batteries. An infrared remote controller possessing rechargeable batteries presents a similar set of undesirable characteristics: (b) the inconvenience of faulty operation under low power conditions; and (d) concern that insufficient charging will result in faulty operation. It is further considered that even an infrared remote controller possessing rechargeable batteries which is further powered by photovoltaic panels presents the same drawbacks: (b) the inconvenience of faulty operation under low power conditions; (d) concern that insufficient charging will result in faulty operation.

DISCUSSION OF THE PRIOR ART

Four Republic of China Patent Applications, Nos.: 80210038; 80201030; 83205743; and 78203670 are known to describe infrared remote controllers which are powered by photovoltaic panels. The devices disclosed by all of these references suffer, however, from the consumption of relatively high amounts of electricity. Due to the high manufacturing cost of photovoltaic panels and the high electrical consumption rate of these devices, all these related R.O.C. applications are considered to disclosure devices which are relatively expensive, undesirably large, and of limited operative duration.

Five U.S. patents are also known which possess some pertinence to the present invention: U.S. Pat. Nos. 5,119,123; 5,387,858; 4,963,811; 5,460,325; 5,164,654; and 4,974,129. The most pertinent of these U.S. patents is considered to be U.S. Pat. No. 5,387,858 which is similar to a preferred embodiment of the present invention in utilizing a rechargeable cell. The device disclosed by this patent however requires a backup cell and comparatively complex control circuitry which are wholly avoided in the present invention.

U.S. Pat. Nos. 5,119,123 and 5,387,858 both describe use of photovoltaic panels and rechargeable cells with an infrared controller, however, both references describe controllers which are infrequently used for outdoors applications, as opposed to the more common type of infrared remote controller used in conjunction with televisions, (TVs), video cassette recorders (VCRs), stereophonic equipment, et cetera. The relatively long recharging time associated with the known photovoltaic panel powered infrared controllers utilizing rechargeable cells is considered to render the devices taught by these disclosures unsatisfactory for control of appliances requiring frequent usage.

Statement of Need

Infrared remote controllers of conventional type using conventional dry cells require routine replacement of the batteries which is wasteful. Known infrared remote controllers utilizing rechargeable batteries suffer from the need to recharge the batteries. If recharging is obtained with photovoltaic panels, which are expensive, the time required for recharging becomes a problem. The various difficulties, including faulty operation, associated with conditions of low power supply in devices using both conventional and rechargeable batteries are considered to remain as problems in the known state of the art.

A need is hence recognized for a device which powers an infrared remote controller which is fully operable under conditions of low power reserve, which may be powered by a rechargeable power source but possesses a low recharging time, and which may be economically powered by photovoltaic panels.

SUMMARY OF THE INVENTION

Objects of the Invention

The encompassing object of the principles relating to the present invention is the provision of high quality electrical power to an infrared remote controller of an electrical appliance.

An auxiliary object of the principles relating to the present invention is the provision of high quality electrical power to an infrared remote controller of an electrical appliance under conditions of low power reserve.

An ancillary object of the principles relating to the present invention is the provision of high quality electrical power to an infrared remote controller of an electrical appliance supplied by a rechargeable power source but possesses a low recharging time.

Another ancillary object of the principles relating to the present invention is the provision of high quality electrical power to an infrared remote controller of an electrical appliance supplied by at least one photovoltaic panel which is economic.

Other objects and advantages of the present invention may be understood from a reading of the detailed discussion below, particularly if conducted with reference to the drawings attached hereto.

Principles Relating to the Present Invention

As mentioned above infrared remote controllers, regardless of the power supply, generally require what has been termed high quality electrical power and the problems ensuing from a condition of low power supply are common to all known types of such controllers. An infrared remote controller requires a certain voltage level for a certain period of time to be fully effective. A condition of low power supply, generally characterized by low voltage but also dependent upon the amperage of current available for that duration required for operation of the infrared remote controller, typically results in diminished range of, difficulty in, and uncertainty in, operation. High quality electricity is considered, for purposes of operating an infrared remote controller, to be characterized by a simple direct current waveform of initial voltage of desired value maintained within a desired range of voltage for the desired length of time. The amperage involved is significant also but, owing to the circuit involved, is assumed to be adequate if a sufficiently high voltage is available in the waveform operating the infrared controller.

It is considered that a capacitor, appropriately sized with respect to both the voltage and the duration desired, provides a suitable power source for the operation of an infrared remote controller. The capacitor requires a power source for recharging and it is suggested that this power source be comprised of either a photovoltaic panel or a rechargeable battery or both. In the last case it is further suggested that the rechargeable battery be placed in series with the photovoltaic panel while a main switch is open and in parallel with the same and the power capacitor when closed. A very simple interface circuit including at least one diode, preferably two or more in parallel, between the photovoltaic panel and the rechargeable battery is also recommended in this case. It is also suggested that a voltage reference or regulator, be provided in series circuit between the capacitor and the infrared remote controller. A testing circuit, connected to the simple interface circuit between the photovoltaic panel and rechargeable battery, is further recommended, preferably including an LED to yield a visual indication of the level of the power reserve available.

The capacitor powering the infrared remote controller is disposed in parallel between the controller and the power supply. This capacitor, hereinafter known as the power capacitor, is distinguished from other lesser capacitors which may be utilized in voltage stabilization, for example, which are utilized in a voltage reference or regulator. The power capacitor is sized to provide a direct current charge of desired voltage for the desired duration for operation of the infrared remote controller.

This power capacitor is preferably supplied with power from a photovoltaic panel which converts light into electricity. The time required to recharge the power capacitor in this case is dependent upon the characteristics of the photovoltaic panel and the amount of light available to the same. A rechargeable battery connected in series with respect to either the photovoltaic panel or the power capacitor, and in parallel with respect to both, effectively minimizes the size or number of the photovoltaic panel(s) required to maintain a quick recovery time and facilitate frequent operation over certain periods separated by longer intervals during which the rechargeable battery is replenished with power by the photovoltaic panel(s).

As mentioned earlier a simple interface circuit in this preferred case is recommended which essentially comprises at least one diode in series circuit between the photovoltaic panel(s) and the rechargeable battery. Two or more diodes in parallel with each other are preferred to reduce resistance. The purpose is simply to prevent backflow of current in what is otherwise a simple series circuit. The voltage regulation and testing circuits recommended above are similarly simple additions to the basic main circuit.

The basic main circuit powering the infrared remote controller has the power capacitor in parallel with both the power source and the infrared remote controller and is in series with said power source with the main switch open and is in series with said infrared remote controller when said main switch is closed. The simplicity of this main circuit is considered to be a major advantage enabled by the use of the power capacitor between the power supply and the infrared remote controller. Other advantages such as quick recovery time, i.e. the time required for recharging after operation necessary for subsequent operation, are attributed to this arrangement as well including minimization of overall expense and size of a device in accordance with the principles relating to the present invention.

BRIEF DESCRIPTION OF THE DRAWINGS

FIG. 1 is a schematic representation of the operation of a device in accordance with the principles relating to the present invention.

FIG. 2 is a graphic representation of the characteristic curves for recharging both a Ni-Cad battery and a power capacitor with voltage as ordinate and time the abscissa.

FIG. 3 is an electrical schematic depicting a basic circuit for an embodiment in accordance with the principles relating to the present invention FIG. 4 is an electrical schematic depicting a full circuit for a preferred embodiment in accordance with the principles relating to the present invention utilizing both photovoltaic panels and rechargeable battery as a power supply, and further including a test circuit.

DETAILED DESCRIPTION OF THE PREFERRED EMBODIMENT

The essential steps in accordance with the principles relating to the present invention are represented in FIG. 1 wherein a power supply 11 supplies, through a simple interface circuit 12, electricity to a power capacitor 13 which powers an infrared remote controller 14. As mentioned above, an infrared remote controller 14 for an outdoors appliance such as a garage door opener or the security system for an automobile or motorcycle, et cetera, is considered to be of a different type than that utilized in remote control of indoor appliances such as a TV, VCR, a stereophonic system, et cetera.

The difference between these two types of infrared remote controllers is in both the desired range of operation and in the frequency of use. It is considered desirable to possess maximum range outdoors at a much lesser frequency than typical of the control of appliances indoors for which a range of only ten feet or less is commonly sufficient. The difference may be considered as a matter of what is hereinafter known as recovery time 16 as represented in FIG. 2 wherein $T_c$ 16 indicates the time required for the power capacitor 13 to recover the full charge desired for operation of the infrared remote controller 14 from a charge of zero. This is contrasted with $T_b$, or the battery recharging time 18 which is the time required for recharging a rechargeable battery 32 to a minimum desired voltage of a desired voltage range 17 from a totally exhausted state. Though a totally exhausted state is not anticipated $T_b$ 18 is useful as a scientific reference which accurately indicates the time required for a rechargeable battery 32 to recover power. The salient point is that the capacitance characteristic 21, seen in FIG. 2 together with the battery recharging characteristic 22, is comparatively rapid and hence the recovery time 16 when utilizing a power capacitor 13 to power the infrared remote controller 14 is comparatively quick in contrast to simply using a rechargeable battery 32.

Typical operational conditions, outdoors or indoors, are considered with regard to capacitor recovery time 16 and battery recharging time 18 as affecting design choices involved in the sizing of the power capacitor 13 and the type of power supply 11 employed. An outdoor application for an infrared remote controller 14 is considered to suggest the use of a photovoltaic panel 31, represented in FIG. 4, which converts light absorbed thereby into direct current electricity, as the sole power supply 11. The power capacitor 13 in this case is expected to be comparatively large because the photovoltaic panel(s) 31 constitute(s) the only power supply 11 utilized and the power capacitor 13 is the only means for storing electricity, i.e. providing a reserve of, electrical power.

Hence in this one particular and very simple embodiment of the principles relating to the present invention, comprised of only a photovoltaic panel 31 as the power supply 11 which charges the power capacitor 13 directly and which in turn powers the infrared remote controller 14 directly when the main power switch 15 is closed, the recovery time 16 is wholly dependent upon the rate of conversion of light into electricity by the photovoltaic panel(s) 31. In this case, however, the recovery time 16 need not be very quick because of the infrequent usage and because the device is outside and the sun, even under cloudy conditions, will provide a large amount of light in comparison with indoor lighting. A device as simple as this, without use of batteries of any type, is hence considered as a feasible and potentially practical case.

In FIG. 3 the basic electrical circuit 10 of an embodiment of the principles relating to the present invention is depicted which is inclusive of the case just discussed wherein the power supply 11 represented in FIG. 3 consists solely of one or more photovoltaic panels 31, however, this power supply 11 may consist of a rechargeable battery 32, or both, as depicted in FIG. 4. As may be seen in FIG. 3, the power supply 11 is in a simple series connection through the interface circuit 12 with the power capacitor 13 when the main switch 15 is open and the right hand side of the basic circuit 10 is essentially in a condition of open circuit. The power capacitor 13 is always, in this state, capable of being charged by the power supply 11 whether comprised of the photovoltaic panel(s) 31, rechargeable batteries 32 or both.

The interface circuit 12 connecting the power supply 11 with the capacitor 13 is preferably equipped with means of preventing the flow of electricity in the reverse direction, from the capacitor 13 to the power supply 11, even in the simple case discussed above wherein at least one photovoltaic panel 31 comprises the sole power supply 11 and the power capacitor 13 comprises the sole means of storing electricity. An alternative and equally simple basic circuit 10 is achieved with a power supply 11 comprised of at least one battery 32, of rechargeable or conventional type. Particularly in the former case and in the case in which both photovoltaic panel(s) 31 and rechargeable batteries 32 are utilized, it is preferred that the interface circuit 12 possess means of preventing reverse current flow comprised of at least one diode 23 as seen in FIG. 4.

The preferred means of preventing reverse current flow is seen in FIG. 4 to comprise at least two diodes 23,24 connected in parallel with respect to each other but together being in series connection with the interface circuit 12 between the photovoltaic panel(s) 31 and the rechargeable batteries 32. A single diode 23 in series connection with the interface circuit 21 would suffice to prevent reverse flow of electricity to the photovoltaic panel(s) 31 but a plurality of diodes 23, 24 in parallel with respect to each other prevents reverse current flow with a lesser resistive load upon the circuit 12 than a single diode 23.

The interface circuit 12 represented in FIG. 4 also possesses a testing circuit 20 connected thereto comprised of a test switch 25, a resistor 29, a plurality of diodes 26, 27, the last preferably comprising a light emitting diode (LED) 27. The particular test circuit 20 shown is a voltage detection circuit with the resistor 29 acting as a current limiting resistor in conjunction with the two prior diodes 26 so that no current reaches the LED 27 if the voltage detected falls below a set value. The minimum operating voltage 19 depicted in FIG. 2 for the infrared remote controller 14, i.e. 2 V, is suggested as the threshold level for detection. This testing circuit 20, as utilized in the preferred embodiment represented in FIG. 4, indicates the level of power reserve held by the battery 32 which is further preferably rechargeable by the photovoltaic panel(s) 31. An LED 27 of appropriate voltage will indicate with relative brightness the voltage present in either the rechargeable battery 32, if utilized, or, if absent, that of the power capacitor 13. In either case the power reserve level is so indicated.

In the preferred embodiment of the principles relating to the present invention depicted in FIG. 4, which may be considered as the case developed in application to indoor usage, the power supply 11 for the capacitor 13 is comprised of both the photovoltaic panel(s) 31 and a rechargeable battery 32. The relatively frequent operation considered to characterize indoor usage, as earlier mentioned, is facilitated by the presence of the rechargeable battery 32 which will provide the power capacitor 13 of appropriate size with a relatively large number of charges when the rechargeable battery 32 is fully charged. It is anticipated that the rechargeable battery 32 will have an essentially diurnal cycle of building and expending the power provided it by the photovoltaic panel(s) 31.

It is also considered that the light available indoors is generally much weaker than that generally available outdoors. It is emphasized that the recovery time 16 required between operation of the infrared remote controller 14 is the time required of the power capacitor 13 to regain a sufficient charge for operation. It was mentioned earlier that the case wherein no battery 32 is used and the power capacitor 13 is recharged directly by the photovoltaic panel(s) 31 was considered appropriate for outdoor use and that a relatively large power capacitor 13 was recommended. Because sunlight is available and because it is not expected to use an outdoor device frequently an otherwise relatively long recovery time 16 is both ameliorated, by the sunlight, and tolerated, by infrequent operation.

For indoor use a smaller power capacitor 13 is recommended which will possess a very brief recovery time 16 if a rechargeable battery 32 is utilized as depicted in FIG. 4. Because the light available indoors is generally less than outdoors, and because photovoltaic panel(s) 31 are expensive, a substantial power reserve, essentially represented by the desired voltage range 17 in FIG. 2, provided by a rechargeable battery 32, which is expected to be replenished diurnally, is preferred to facilitate rapid and frequent usage powered by a relatively small power capacitor 13 which is expected to have a very rapid recovery time 16.

It is emphasized that FIG. 2 represents both the recover time 16 which is required of recharging the power capacitor 13, and the battery recharging time 18, which is required of recharging a rechargeable battery 32, with two separate curves known as capacitance and recharging characteristics 21 and 22, respectively. Each cycle of discharge and charge of the power capacitor 13 effects only a modest diminishment in the voltage of the rechargeable battery 32 and this voltage is not expected to fall below the desired voltage range 17 required for operation. The battery recharging time 18 is, as earlier mentioned, that time required for the rechargeable battery 32 to obtain the minimum value for the desired voltage range 17 for operation from a fully exhausted state which state is not expected to be obtained in practice but provides a useful reference because it is easily verified and defines the recharging characteristic 22 for the rechargeable battery 32.

Operational curves for the rechargeable battery 32 are expected to remain within the desired voltage range 17 represented in FIG. 2. Replenishment of power from the photovoltaic panel(s) 31 over time does not effect a large rate of increase in voltage within this desired voltage range 17 though it does increase the amperage available as the rate of power increase over time is directly related to that provided by the photovoltaic panel(s) 31. The diminishment of the voltage held by the rechargeable battery 32 effected by recharging the power capacitor 13 is similarly modest with respect to voltage and sufficient amperage is assumed if the voltage available is within the desired voltage range 17. It is thus recognized that the rate of power replenishment available from the photovoltaic panel(s) 31 is critical in determining the duration of frequent use enabled.

For the purposes of providing consistently reproducible, i.e. reliable, scientific data, the recharging of a nickel cadmium (Ni-Cad) battery 32 with four standard size photovoltaic panels 31, each one square centimeter in area, from an exhausted state, as represented in FIG. 2, was conducted under various conditions of ambient light and the flow of current in milliamps per second and the rising voltage, in volts per second, and the minimum battery recharging time 18, in minutes, calculated. The results are given below in Table 1.

TABLE 1

Minimum Recharging Periods

| Environment | ($\mu$A/sec) | V/sec | Minutes |
|---|---|---|---|
| Outdoors, sunny: | 5730 | 0.049 | <1 |
| Outdoors, cloudy: | 2000 | 0.0225 | <2 |
| Indoors, sunny: | 1380 | 0.0062 | <6.5 |
| Indoors, night near 60 W bulb: | | | |
| 9 cm away: | 2330 | 0.0033 | 12 |
| 13 cm away: | 1200 | 0.0015 | <27 |
| 18 cm away: | 784 | 0.0012 | 33 |
| 27 cm away: | 436 | 0.000441 | 91 |

From the results given above it is considered that a preferred embodiment of the principles relating to the present invention using Ni-Cad rechargeable batteries 32 and four square centimeters of photovoltaic panel 31 achieves satisfactory characteristics for both indoor and outdoor use and that actually, both indoor and outdoor use without the rechargeable batteries 32, is also quite feasible. The two separate cases are considered further below.

One may assume, for example, that an infrared remote controller 14 utilized indoors might be operated one hundred times a day and that the duration of operation is one second. This results in the consumption of 7 mA/sec according to the infrared remote controller 14 utilized which results in 700 mA per day. Even if the device is left inside on a cloudy day without benefit of interior lighting and the photovoltaic panels 31 provide only 36 $\mu$A/sec, 700 mA is achieved in 5.4 hours which is wholly satisfactory for a diurnal recharging cycle as anticipated. If the same device is left near a window on a sunny day a flow of 1380 $\mu$A for twelve hours yields 59616 $\mu$A which provides enough power reserve for operation 8516 times or for several weeks of expected usage.

In the case that the rechargeable batteries 32 are omitted, or have exceeded useful life and no longer providing useful power reserve, the combination of photovoltaic panels 31, interface circuit 12, and power capacitor 13 will, it is further demonstrated, provide enough power reserve for satisfactory operation. With the infrared remote controller 14 consuming in each operation 100 mA for one second 0.7 Coulombs of charge is expended at the assumed rate of one hundred operations daily. A power capacitor 13 of 2 Faraday at 4.2 V stores 8.4 Coulomb. As the minimum operable voltage 19 is 2 V, as represented in FIG. 2, 4.4 Coulomb is available, which, at 0.7 Coulomb usage per day, yields 6.3 days use.

This amount of available charge, 4.4 Coulomb, can be replenished by four square centimeters of photovoltaic panel 31 in 12.8 minutes outdoors when sunny, in 53.1 minutes when indoors and sunny, in 31.5 minutes 9 cm away from a 60 W bulb at night, and in 2.8 hours when 27 cm away from a 60 W bulb at night. It is hence expected that adequate power for a full week's usage, outdoors or indoors, may readily be provided without the use of batteries 32.

An infrared remote controller 14 is typically equipped with a voltage regulator or voltage reference which constitutes means of voltage regulation 30, as represented in FIG. 4, which both fixes and stabilizes the input voltage level. A voltage regulator, in contrast to a voltage reference, also provides additional functions such as higher power and safety protection, which are absent upon the voltage reference. Either is deemed adequate for the purposes of the present invention in order to assure faultless operation.

It is also noted that the pair of diodes 23 and 24 utilized in the above example to prevent reverse current flow to the photovoltaic panels 31 resulted in a voltage drop across the interface circuit 12 of 0.6 V, that 0.3–0.7 V voltage drop is expected in an operable device in accordance with the principles relating to the present invention, and that the four photovoltaic panels 31 each produce 1.2 V and were serially connected. The consequent 4.8 V was hence dropped to 4.2 V at the power capacitor 13 which value represents the high value of the desired voltage range 17 for operation of the infrared remote controller 14.

This and any other details of the practical operating characteristics of the components utilized are expected to be within the mien of one practiced in the art for whom the best manner of making and utilizing a preferred embodiment of the principles relating to the present invention the detailed discussion above is intended. Said discussion is not to be interpreted as being in any manner restrictive of the scope of the invention or the rights secured by Letters Patent protecting the same for which I claim:

1. A device comprising:

an infrared remote controller, a voltage reference, a power supply, a power capacitor of at least 0.1 Faraday, and a main switch all electrically connected by a basic main circuit such that said power capacitor is in parallel with both said power supply and said infrared remote controller and is further in series with said power supply through an interface circuit with said main switch open and in series with said infrared remote controller with said main switch closed;

said power capacitor being electrically connected to said infrared remote controller through said voltage reference such that electrical power of fixed stabilized voltage is provided to said infrared remote controller from said power capacitor when said main switch is closed;

said interface circuit electrically allowing the flow of electricity from said power supply to said power capacitor and when said main switch is open said electricity from said power supply to said power capacitor effects charging of said power capacitor;

whereby closing of said main switch provides electrical power to said infrared remote controller from said power capacitor and opening of said main switch provides replenishment of the electrical charge held by said power capacitor.

2. The device of claim 1 wherein said infrared remote controller is electrically connected to said power capacitor through a voltage regulator to fix and stabilize the voltage of the electricity provided said infrared remote controller by said power capacitor.

3. The device of claim 1 wherein said power supply includes at least one battery.

4. The device of claim 3 wherein said power supply includes at least one battery which is rechargeable.

5. The device of claim 1 wherein said interface circuit includes at least one diode which prevents the flow of electricity from said power capacitor to said power supply.

6. The device of claim 5 wherein at least two diodes in parallel with respect to each other are included in said interface circuit in order to prevent the flow of electricity from said power capacitor to said power supply.

7. The device of claim 1 further including a testing circuit electrically connected to said interface circuit possessing a test switch which when closed indicates the power level of the power supply.

8. The device of claim 7 wherein said testing circuit includes a light emitting diode (LED) and the power level of the power supply is indicated by the brightness of the LED.

9. The device of claim 1 wherein said power capacitor possesses a charge capacity of at least one Faraday.

10. The device of claim 9 wherein said power capacitor possesses a charge capacity of between one and three Faraday.

11. The device of claim 1 wherein said power source includes at least one photovoltaic panel capable of converting light into electricity.

12. The device of claim 11 wherein said interface circuit includes at least one diode which prevents the flow of electricity from said power capacitor to said power supply.

13. The device of claim 12 wherein at least two diodes in parallel with respect to each other are included in said interface circuit in order to prevent the flow of electricity from said power capacitor to said power supply.

14. The device of claim 11 wherein said power supply includes at least one rechargeable battery.

15. The device of claim 14 wherein said interface circuit includes at least one diode which prevents the flow of electricity from said power capacitor to said power supply.

16. The device of claim 15 wherein at least two diodes in parallel with respect to each other are included in said interface circuit in order to prevent the flow of electricity from said power capacitor to said power supply.

17. The device of claim 16 further including a testing circuit electrically connected to said interface circuit possessing a test switch which when closed indicates the power level of the power supply.

18. The device of claim 17 wherein said testing circuit includes a light emitting diode (LED) which indicates the power level of the power supply by the brightness of the LED.

* * * * *